United States Patent
Kapylou et al.

(10) Patent No.: US 9,437,874 B2
(45) Date of Patent: Sep. 6, 2016

(54) ACTIVE MATERIAL FOR A LITHIUM SECONDARY BATTERY, METHOD OF MANUFACTURING THE SAME, ELECTRODE INCLUDING THE ACTIVE MATERIAL, AND LITHIUM SECONDARY BATTERY INCLUDING THE ELECTRODE

(71) Applicant: SAMSUNG SDI CO., LTD., Yongin-si, Gyeonggi-do (KR)

(72) Inventors: Andrei Kapylou, Yongin-si (KR); Jay-Hyok Song, Yongin-si (KR); Evgeniya Matulevich, Yongin-si (KR); Chang-Wook Kim, Yongin-si (KR); Yong-Chan You, Yongin-si (KR); Sun-Ho Kang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 196 days.

(21) Appl. No.: 14/037,572

(22) Filed: Sep. 26, 2013

(65) Prior Publication Data
US 2014/0367609 A1    Dec. 18, 2014

Related U.S. Application Data

(60) Provisional application No. 61/836,267, filed on Jun. 18, 2013.

(51) Int. Cl.
*H01M 4/505* (2010.01)
*H01M 4/525* (2010.01)
(Continued)

(52) U.S. Cl.
CPC .............. *H01M 4/505* (2013.01); *C01G 53/50* (2013.01); *H01M 4/525* (2013.01);
(Continued)

(58) Field of Classification Search
CPC .. H01M 4/505; H01M 4/525; H01M 4/1315; C01G 53/50; C01P 2002/50; C01P 2002/54
USPC ............................................. 252/182.1, 500
See application file for complete search history.

(56) References Cited

U.S. PATENT DOCUMENTS

2006/0057466 A1\*  3/2006  Suhara ................ H01M 4/1315
                                                                    429/322
2008/0211530 A1    9/2008  Gattiker et al.
(Continued)

FOREIGN PATENT DOCUMENTS

KR    10-2005-0096109 A    10/2005
KR    10-2009-0111525 A    10/2009
(Continued)

OTHER PUBLICATIONS

Amine et al. "Impacts of fluorine on the electrochemical properties of Li[Ni0.5Mn0.5]O2 and Li[Li0.2Ni0.15Co0.1Mn0.55]O2". Oct. 26, 2006. ScienceDirect. Journal of Fluorine Chemistry 128 (2007) 263-268. 6 Total Pages.\*

(Continued)

*Primary Examiner* — Mark Kopec
*Assistant Examiner* — Danny N Kang
(74) *Attorney, Agent, or Firm* — Lee & Morse, P.C.

(57) ABSTRACT

An active material for a lithium secondary battery, a method of manufacturing the same, an electrode including the active material, and a lithium secondary battery including the electrode, the active material including a lithium composite oxide represented by the following Formula 1:

$Li[Li_xNi_aCo_bMn_c]O_{2-y}F_y$.    [Formula 1]

17 Claims, 5 Drawing Sheets

(51) Int. Cl.
*C01G 53/00* (2006.01)
*H01M 4/1315* (2010.01)

(52) U.S. Cl.
CPC ...... *C01P 2002/50* (2013.01); *C01P 2002/54* (2013.01); *C01P 2002/72* (2013.01); *C01P 2004/03* (2013.01); *C01P 2004/61* (2013.01); *C01P 2006/12* (2013.01); *H01M 4/1315* (2013.01); *Y02E 60/122* (2013.01)

(56) References Cited

U.S. PATENT DOCUMENTS

2009/0297947 A1* 12/2009 Deng .................. H01M 4/0471
429/218.1
2012/0034516 A1  2/2012 Koo et al.

FOREIGN PATENT DOCUMENTS

KR  10-2010-0052419 A  5/2010
KR  10-2012-0030951 A  3/2012

OTHER PUBLICATIONS

Amine, K., et al., "Impacts of fluorine on the electrochemical properties of Li[Ni$_{0.5}$Mn$_{0.5}$]O$_2$ and Li[Li$_{0.2}$Ni$_{0.15}$Co$_{0.1}$Mn$_{0.55}$]O$_2$," *Journal of Fluorine Chemistry*, 2007, vol. 128, pp. 263-268.

Kang, S.-H., et al., "The Effects of Acid Treatment on the Electrochemical Properties of 0.5 Li$_2$MnO$_3$•0.5 LiNi$_{0.44}$Co$_{0.25}$Mn$_{0.31}$O$_2$ Electrodes in Lithium Cells," *Journal of the Electrochemical Society*, 2006, vol. 153, No. 6, pp. A1186-A1192.

* cited by examiner

ACTIVE MATERIAL FOR A LITHIUM SECONDARY BATTERY, METHOD OF MANUFACTURING THE SAME, ELECTRODE INCLUDING THE ACTIVE MATERIAL, AND LITHIUM SECONDARY BATTERY INCLUDING THE ELECTRODE

The present application claims priority under 35 U.S.C. §119(e) to U.S. Provisional Application No. 61/836,267, filed on Jun. 18, 2013, and entitled: "POSITIVE ACTIVE MATERIAL FOR LITHIUM SECONDARY BATTERY, METHOD OF PREPARING THE SAME, AND LITHIUM SECONDARY BATTERY EMPLOYING THE SAME," which is incorporated herein by reference in its entirety.

BACKGROUND

1. Field

Embodiments relate to an active material for a lithium secondary battery, a method of manufacturing the same, an electrode including the active material, and a lithium secondary battery including the electrode.

2. Description of the Related Art

The use of lithium secondary batteries in, e.g., mobile phones, camcorders, and notebook computers is rapidly increasing. A capacity of a lithium secondary battery may be dependent upon a positive active material, and electrochemical characteristics of the positive active material may determine whether a long-term use at a high rate is possible or whether an initial capacity is maintained constant during charging and discharging.

SUMMARY

Embodiments are directed to an active material for a lithium secondary battery, a method of manufacturing the same, an electrode including the active material, and a lithium secondary battery including the electrode.

The embodiments may be realized by providing an active material for a lithium secondary battery, the active material comprising a lithium composite oxide represented by the following Formula 1:

$$Li[Li_xNi_aCo_bMn_c]O_{2-y}F_y,$$ [Formula 1]

wherein in Formula 1, x, a, b, c, and y satisfy the following relations: $0.05 \leq x \leq 0.3$, $0.12 \leq a \leq 0.25$, $0.00 \leq b \leq 0.25$, $0.45 \leq c \leq 0.60$, $x+a+b+c=1.0$, $1.25 \leq (1+x)/(a+b+c) \leq 1.6$, and $0 < y \leq 0.1$, and the lithium composite oxide has a full width at half maximum of a diffraction angle at a (003) surface of about 0.22° or less in a powder X-ray diffraction spectrum obtained by using CuKα ray.

The full width at half maximum of a diffraction angle at the (003) surface may be about 0.06° to about 0.22°.

The lithium composite oxide represented by Formula 1 may be represented by the following Formula 1a:

$$Li[Li_{1/6}Ni_{1/6}Co_{1/6}Mn_{1/2}]O_{2-y}F_y, \text{ in which } 0<y\leq0.1.$$ [Formula 1a]

In Formula 1, $0.02 \leq y \leq 0.06$.

The full width at half maximum of a diffraction angle at the (003) surface may be about 0.213° to about 0.219 °.

The lithium composite oxide represented by Formula 1 may be one of $Li[Li_{1/6}Ni_{1/6}Co_{1/6}Mn_{1/2}]O_{1.96}F_{0.04}$, $Li[Li_{1/6}Ni_{1/6}Co_{1/6}Mn_{1/2}]O_{1.94}F_{0.06}$, or $Li[Li_{1/6}Ni_{1/6}Co_{1/6}Mn_{1/2}]O_{1.98}F_{0.02}$.

In Formula 1, x, a, b, c, and y may satisfy the following relations: $0.1 \leq x \leq 0.2$, $0.17 \leq a \leq 0.21$, $0.05 \leq b \leq 0.17$, $0.50 \leq c \leq 0.55$, $0.01 \leq y \leq 0.1$.

The embodiments may also be realized by providing a method of manufacturing an active material for a lithium secondary battery, the method including mixing a fluorine-containing compound, a lithium compound, and a metal hydroxide represented by the following Formula 2:

$$Ni_aCo_bMn_c(OH)_2$$ [Formula 2]

wherein, in Formula 2, a, b, and c satisfy the following relations: $0.15 \leq a \leq 0.30$, $0.0 \leq b \leq 0.30$, $0.55 \leq c \leq 0.70$, and $a+b+c=1.0$; heat treating the mixture under an oxidizing atmosphere at a temperature of about 650° C. to about 850° C.; and cooling the heat treated mixture at a cooling rate of about 0.1° C./min to about 2° C./min.

The manufactured active material may include a lithium composite oxide represented by the following Formula 1:

$$Li[Li_xNi_aCo_bMn_c]O_{2-y}F_y,$$ [Formula 1]

wherein, in Formula 1, x, a, b, c, and y satisfy the following relations: $0.05 \leq x \leq 0.3$, $0.12 \leq a \leq 0.25$, $0.00 \leq b \leq 0.25$, $0.45 \leq c \leq 0.60$, $x+a+b+c=1.0$, $1.25 \leq (1+x)/(a+b+c) \leq 1.6$, and $0<y\leq0.1$.

The lithium composite oxide may have a full width at half maximum of a diffraction angle at a (003) surface of about 0.22° or less in a powder X-ray diffraction spectrum obtained by using CuKα ray.

The full width at half maximum of a diffraction angle at the (003) surface may be about 0.213° to about 0219 °.

The fluorine-containing compound may include LiF or $NH_4F$.

The cooling may be performed for about 350 to about 7,000 minutes.

The heat treating may be performed at about 675° C. to about 750° C.

The heat treating may be performed for about 1 to about 10 hours.

The oxidizing atmosphere may include about 10 to about 20 vol % of oxygen or air, and about 80 to about 90 vol % of inert gas.

The metal hydroxide represented by Formula 2 may include one of $Ni_{1/6}Co_{1/6}Mn_{1/2}(OH)_2$ or $Ni_{0.2}Co_{0.2}Mn_{0.6}(OH)_2$.

The manufactured active material represented by Formula 1 is one of $Li[Li_{1/6}Ni_{1/6}Co_{1/6}Mn_{1/2}]O_{1.96}F_{0.04}$, $Li[Li_{1/6}Ni_{1/6}Co_{1/6}Mn_{1/2}]O_{1.94}F_{0.06}$, or $Li[Li_{1/6}Ni_{1/6}Co_{1/6}Mn_{1/2}]O_{1.98}F_{0.02}$.

The embodiments may also be realized by providing an electrode for a lithium secondary battery, the electrode comprising the active material according to an embodiment.

The embodiments may also be realized by providing a lithium secondary battery including the electrode according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
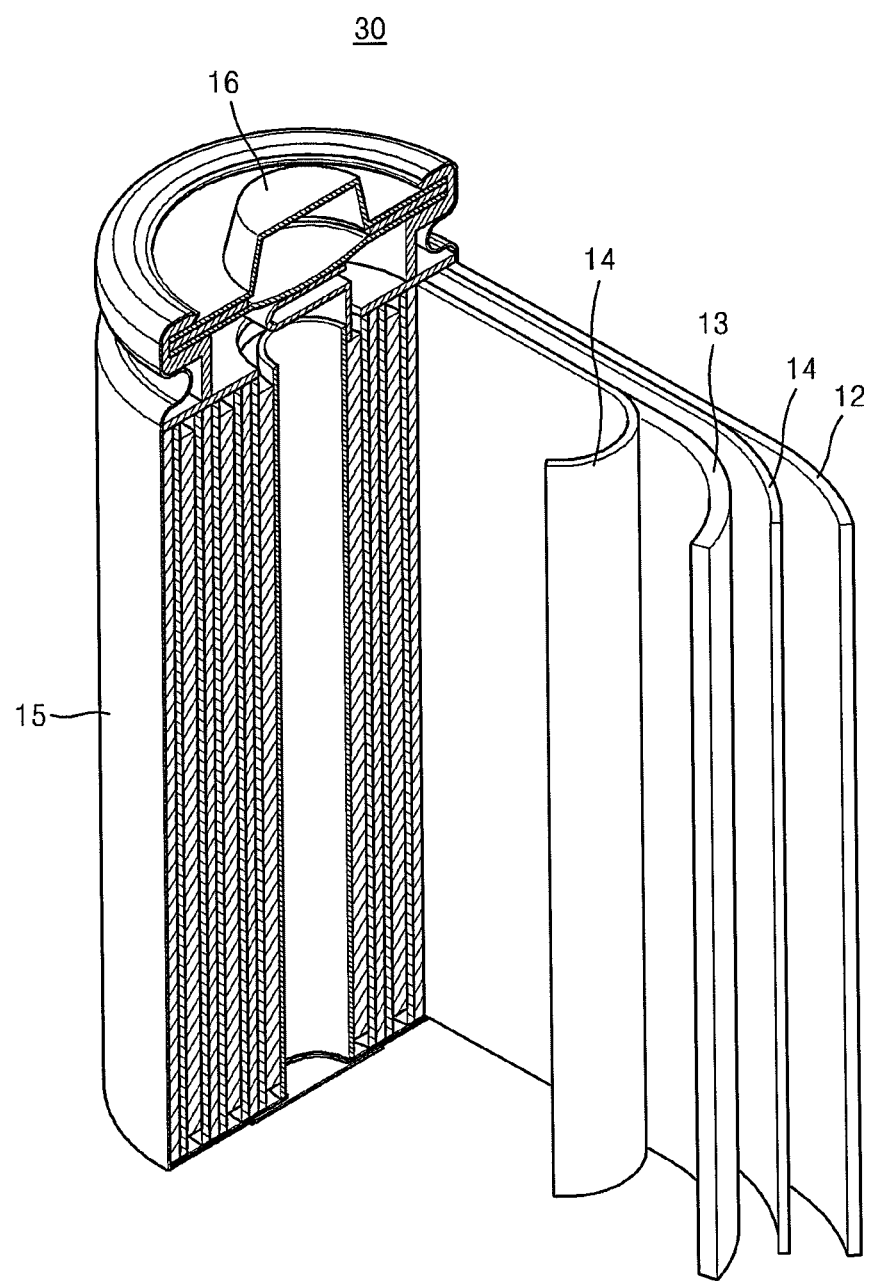
FIG. 1 illustrates a schematic view of a lithium secondary battery according to an embodiment.
Figure 2:
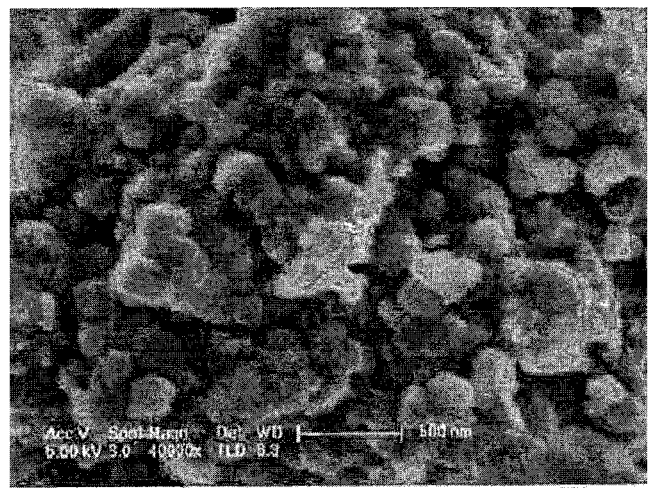
FIGS. 2 to 7 illustrate scanning electron microscopic images of lithium composite oxides prepared according to Examples 1 and 2 and Comparative Examples 1 to 4.
Figure 3:
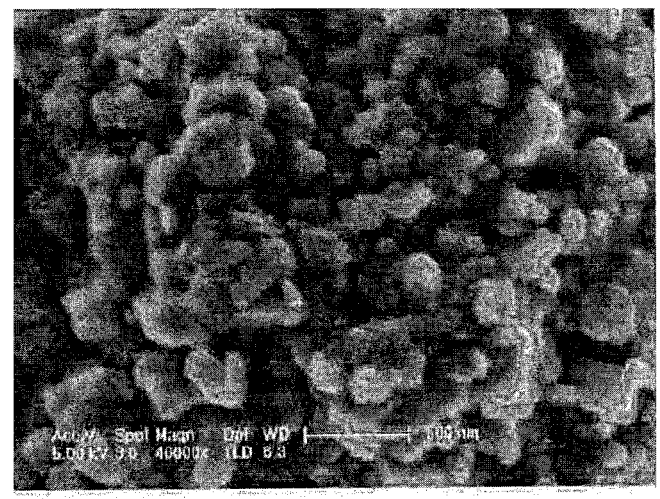
Figure 4:
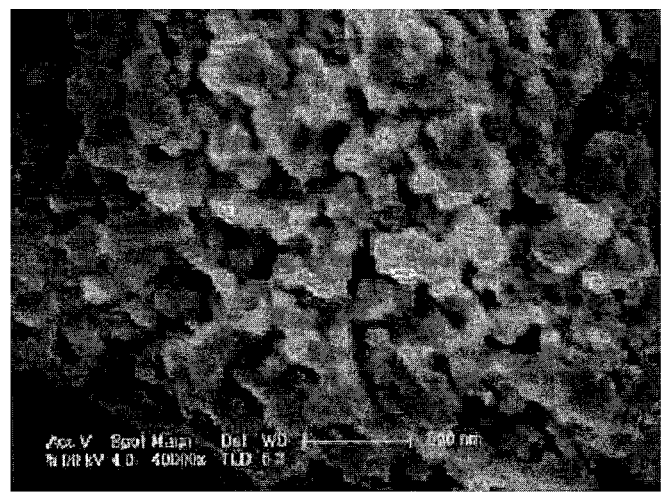
Figure 5:
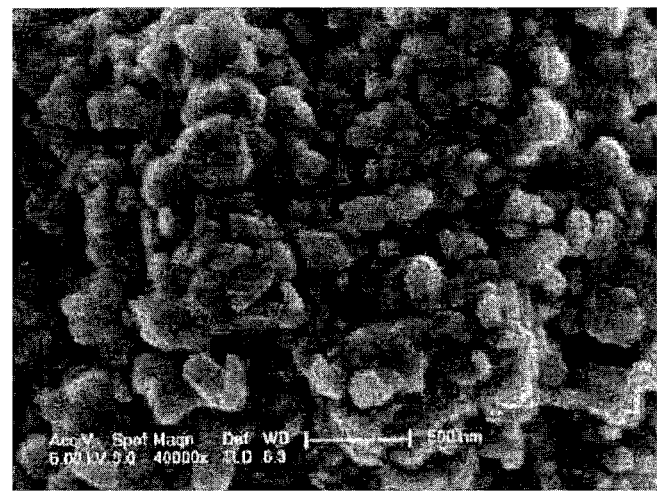
Figure 6:
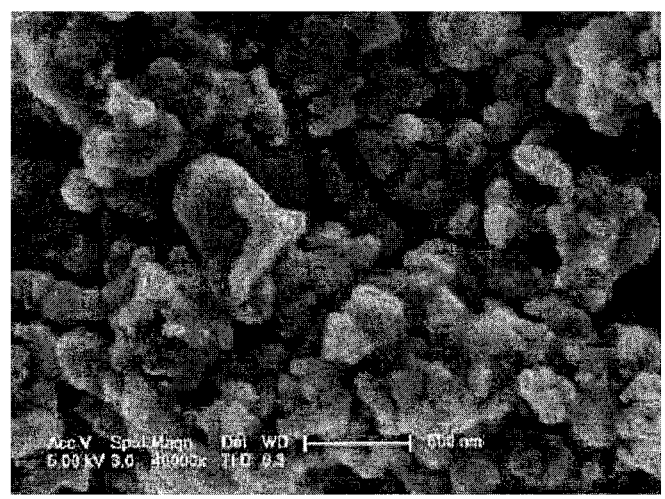
Figure 7:
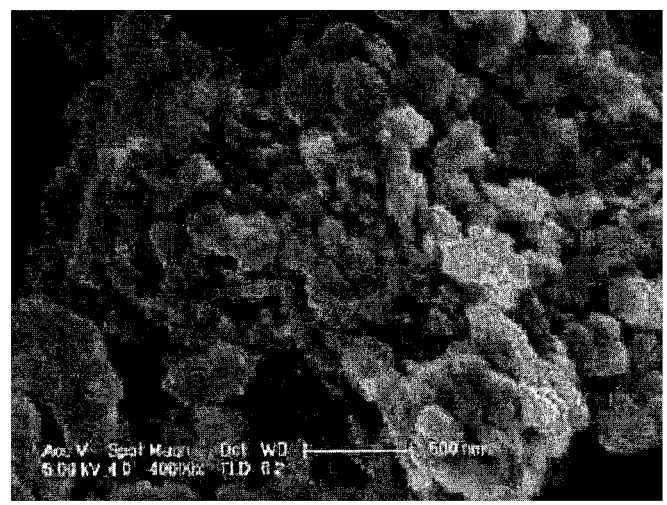

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

The positive active material according to an embodiment may include a lithium composite oxide represented by Formula 1, below. The lithium composite oxide maybe prepared by mixing a metal hydroxide represented by Formula 2 below with at least one fluoride compound (e.g., lithium fluoride (LiF) or ammonium fluoride ($NH_4F$)), and a lithium compound, heat treating the mixture under an oxidizing atmosphere at a temperature of about 650 to about 850° C., and cooling the heat treated product at a rate of about 0.1° C./min to about 2° C./min.

$Li[Li_xNi_aCo_bMn_c]O_{2-y}F_y$, [Formula 1]

In Formula 1, 0.05≤x≤0.3, 0.12≤a≤0.25, 0.00≤b≤0.25, and 0.45≤c≤0.60, wherein x+a+b+c=1.0, 1.25≤(1+x)/(a+b+c)≤1.6, and 0≤y≤0.1.

$Ni_aCo_bMn_c(OH)_2$ [Formula 2]

In Formula 2, 0.15≤a≤0.30, 0.0≤b≤0.30, and 0.55≤c≤0.70, and a+b+c=1.0.

As noted above, after the heat treatment, the cooling rate may be about 0.1° C./min to about 2° C./min, e.g., 0.5° C./min. When the cooling is performed in such a cooling rate range, a lithium composite oxide in which fluorine is homogeneously dispersed may be obtained, and the lithium composite oxide may not have an irreversible capacity loss during initial charging and discharging. Accordingly, the lithium composite oxide may have excellent electrochemical characteristics, e.g., capacity characteristics Maintaining the cooling rate at about 0.1° C./min or greater may help prevent a particle size of the lithium composite oxide from increasing, thereby preventing a decrease in electrochemical characteristics. Maintaining the cooling rate at about 2° C./min or less may help prevent fluorine (F) from being heterogeneously dispersed, thereby preventing a decrease in electrochemical characteristics. In an implementation, the cooing time may be about 350 minutes to about 7,000 minutes.

The heat treating may be performed at a temperature of about 650° C. to about 850° C., e.g., about 675° C. to about 750° C. When the heat treatment temperature is within the range described above, a prepared positive active material for a lithium secondary battery may have excellent capacity characteristics.

A heat treatment time may vary according to the heat treatment temperature. In an implementation, the heat treatment time may be, e.g., about 1 to about 10 hours.

The oxidizing gas atmosphere may include an oxidizing gas, e.g., oxygen or air. In an implementation, the oxidizing gas may include, e.g., about 10 to about 20 vol % of oxygen or air and about 80 to about 90 vol % of inert gas.

The lithium compound may include, e.g., lithium carbonate.

As described above fluoride compound may include, e.g., at least one selected from lithium fluoride (LiF) and ammonium fluoride ($NH_4F$). When such fluoride compounds are used, they may act as an aid for calcination at low temperature to thereby facilitate the formation of a crystal phase of a starting material. Thus, an improvement in a crystal degree of an active material may be achieved. Also, when fluorine (F) is added to a Li-rich positive electrode material, to compensate for charges, the number of oxidation of transition metals may decrease. Such reduced transition metal ions may further act as an electron donator (which may be lacking during charging and discharging). Thus, undesirable oxidization of a Li-rich positive active material due to an electron-lack phenomenon of a Li-rich positive active material occurring at high voltage and generation of oxygen may be suppressed, and the structure of the Li-rich positive electrode material may be stabilized.

An amount of the fluoride compound and the lithium compound may be stoichiometrically controlled to obtain the composition of the lithium composite oxide represented by Formula 1.

The metal hydroxide represented by Formula 2 may be prepared as follows.

A nickel precursor, a cobalt precursor, and a manganese precursor may be mixed with a solvent. A chelating agent and a pH controller may be added thereto to perform a co-precipitation reaction.

A co-precipitate (obtained with or without purging the mixture with nitrogen) may be washed with water and dried to obtain metal hydroxide.

The chelating agent may include, e.g., ammonia or ammonium sulfate. The pH controller may include, e.g., a sodium hydroxide solution.

The nickel precursor may include, e.g., nickel sulfate, nickel nitrate, nickel chloride, or nickel hydroxide. The cobalt precursor may include, e.g., cobalt sulfate, cobalt nitrate, cobalt chloride, or cobalt hydroxide. The manganese precursor may include, e.g., manganese sulfate, manganese nitrate, or manganese chloride.

Amounts of the nickel precursor, the manganese precursor, and the cobalt precursor may be stoichiometrically controlled to obtain the lithium composite oxide of Formula 1.

The solvent may include, e.g., water. An amount of the solvent may be about 100 to about 3,000 parts by weight, based on 100 parts by weight of the nickel precursor. When the amount of the solvent is within this range, the respective components may be homogeneously mixed.

As noted above, the pH controller may include, e.g., a sodium hydroxide solution. A pH of the resultant mixture may be adjusted to be in a range of about 11 to about 12.5, e.g., about 11.5 to about 12.0, by controlling the amount of the pH controller.

A precipitate may be obtained from the result, and then, the precipitate may be washed with pure water and dried to obtain the metal hydroxide of Formula 2.

The metal hydroxide of Formula 2 may include, e.g., $Ni_{1/6}Co_{1/6}Mn_{1/2}(OH)_2$ or $Ni_{0.2}Co_{0.2}Mn_{0.6}(OH)_2$.

The positive active material for a lithium secondary battery according to an embodiment may include the lithium composite oxide represented by Formula 1 below. In an implementation, the lithium composite oxide represented by Formula 1 may have a full width at half maximum of a diffraction angle at a (003) surface of about 0.22° or less in a powder X-ray diffraction spectrum obtained by using CuKα ray:

$$Li[Li_xNi_aCo_bMn_c]O_{2-y}F_y \quad \text{[Formula 1]}$$

In Formula 1, 05≤x≤0.3, 0.12≤a≤0.25, 0.00≤b≤0.25, and 0.45≤c≤0.60, wherein x+a+b+c=1.0, 1.25≤(1+x)/(a+b+c)≤1.6, and 0≤y≤0.1.

x in Formula 1 may be, e.g., 0.1≤x≤0.2, and 0.17≤a≤0.21, 0.05≤b≤0.17, 0.50≤c≤0.55, and 0.01≤y≤0.1.

In an implementation, the lithium composite oxide represented by Formula 1 may be, e.g., $Li[Li_{1/6}Ni_{1/6}Co_{1/6}Mn_{1/2}]O_{2-y}F_y$ (0≤y≤0.1).

In the lithium composite oxide represented by Formula 1, some oxygen atoms may be substituted with fluorine atoms. Compared to a layered-structure lithium composite oxide in which some oxygen atoms are not substituted with fluorine atoms (e.g., when y of Formula 1 is 0), the lithium composite oxide according to an embodiment may exhibit improved electrochemical characteristics. Thus, the lithium composite oxide represented by Formula 1 may have excellent initial capacity and high-rate characteristics and excellent cycle characteristics.

A full width at half maximum of a diffraction angle at the (003) surface in a powder X-ray diffraction spectrum obtained by using CuKα ray of the lithium composite oxide may be about 0.22° or less, e.g., about 0.06 to about 0.22°. When the full width is within this range, the positive active material may have excellent initial capacity and high-rate characteristics.

Maintaining the full width at half maximum of a diffraction angle at the (003) surface at about 0.22° or less may help prevent a decrease in cyclic durability. In an implementation, a full width at half maximum at the (003) surface in the X-ray diffraction spectrum may be about 0.213 to about 0.219°.

A BET surface area of the positive active material may be about 2.5 m²/g to about 9 m²/g, e.g., about 4.5 m²/g to about 5.2 m²/g. When the specific surface of the positive active material is within this range, a discharging capacity per initial unit weight is high, and also, a decrease in lifespan characteristics may be minimized.

A capacity per weight of the positive active material of a lithium secondary battery may be about 250 mAh/g or more, e.g., about 250 mAh/g to about 290 mAh/g, at 0.1 C rate and 5 mg/cm² of a loading level.

An average size of primary particles of the positive active material may be about 2 μm to about 6 μm.

The positive active material for a positive active material may be used in a mixed form with at least one other suitable lithium transition metal oxide.

An example of the suitable lithium transition metal oxide may include at least one of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (wherein, 0≤Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (wherein, 0<Z<2), $LiCoPO_4$, and $LiFePO_4$.

Hereinafter, a method of manufacturing a lithium secondary battery by using the positive active material for a lithium secondary battery according to an embodiment will be described in detail. In the present embodiment, the lithium secondary battery may include a positive electrode, a negative electrode, a lithium salt-containing non-aqueous electrolyte, and a separator.

The positive electrode and the negative electrode may be respectively manufactured by coating and drying a composition for forming a positive active material and a composition for forming a negative electrode on current collectors.

The composition for forming the positive active material may be prepared by mixing a positive active material, a conductive agent, a binder, and a solvent. The positive active material may include the lithium composite oxide represented by Formula 1.

The binder may facilitate binding of an active material with respect to a conductive agent and a current collector, and may be added in an amount of about 1 to about 50 parts by weight, based on 100 parts by weight of the positive active material. Non-limiting examples of the binder may include polyvinylidene fluoride, polyvinylalcohol, carboxycellulose (CMC), starch, hydroxypropylcellulose, regeneration cellulose, polyvinylpyrrolidone, tetrafluoroethylene, polyethylene, polypropylene, ethylene-propylene-diene ter polymer (EPDM), sulfonated EPDM, styrene butadiene rubber, fluorine rubber, and various copolymers. An amount of the binder may be about 2 to about 5 parts by weight, based on 100 parts by weight of the positive active material. When the amount of the binder is within this range, a satisfactory binding force of the positive active material layer to the current collector may be achieved.

The conductive agent may include a suitable conductive agent that does not cause any chemical change in a corresponding battery and has conductivity. Examples of the conductive agent may include graphite, such as natural graphite or artificial graphite; a carbonaceous material, such as, carbon black, acetylene black, ketjen black, channel black, furnace black, lamp black, or summer black; a conductive fiber, such as carbon fiber or metal fiber; carbon fluoride; metal powder, such as aluminum or nickel powder; a conductive whisker, such as zinc oxide or potassium; a conductive metal oxide, such as titanium oxide; and a conductive material, such as a polyphenylene derivative.

An amount of the conductive agent may be about 2 to about 5 parts by weight, based on 100 parts by weight of the positive active material. When the amount of the conductive agent is within this range, a finally obtained electrode may have excellent conductivity.

The solvent may include, e.g., N-methylpyrrolidone, but is not limited thereto.

An amount of the solvent may be in a range of about 1 to about 10 parts by weight, based on 100 parts by weight of the positive active material. When the amount of the solvent is within this range, the positive active material may be easily formed.

A positive current collector may have a thickness of about 3 μm to about 500 μm, and may include a suitable current collector that does not cause any chemical change in a corresponding battery and has conductivity. Examples of a material for forming the positive current collector may include stainless steel, aluminum, nickel, titanium, heat treated carbon, and aluminum or stainless steel that is surface treated with carbon, nickel, titanium, or silver. The current collector may have a fine uneven structure at its surface to increase a binding force with respect to a positive active material. The current collector may have various shapes, e.g., film, sheet, foil, net, porous, foam, or nonwoven shape.

Separately, a negative active material, a binder, a conductive agent, and a solvent may be mixed to prepare the composition for forming a negative active material layer An example of the negative active material may include a material that allows lithium ions to intercalate thereinto or deintercalate therefrom. The negative active material may include a carbonaceous material, e.g., carbon, lithium metal, an alloy thereof, or a silicon oxide-based material, but is not limited thereto. In an implementation, silicon oxide may be used as the negative active material.

An amount of the binder may be about 1 to about 50 parts by weight, based on 100 parts by weight of the negative active material. Examples of the binder may be the same as those described above in connection with the positive electrode.

An amount of the conductive agent may be about 1 to about 5 parts by weight, based on 100 parts by weight of the negative active material. When the amount of the conductive agent is within this range, a finally obtained negative electrode may have excellent conductivity.

An amount of the solvent may be about 1 to about 10 parts by weight, based on 100 parts by weight of the negative active material. When the amount of the solvent is within this range, the negative active material layer may be easily formed.

The conductive agent and the solvent may be the same as those described above in connection with the positive electrode.

A negative current collector may have a thickness of about 3 μm to about 500 μm. The negative current collector may include a suitable current collector that does not cause any chemical change in a corresponding battery and has conductivity. Examples of a material suitable for forming the negative current collector may include copper, stainless steel, aluminum, nickel, titanium, heat treated carbon, or copper or stainless steel that is surface treated with carbon, nickel, titanium, silver, and an aluminum-cadmium alloy. In an implementation, like the positive current collector, the negative current collector may have a fine uneven structure at its surface to increase a binding force thereof with respect to a negative active material. For example, the negative current collector may have various shapes, such as film, sheet, foil, net, porous, foam, or non-woven shape.

A separator may be disposed between the positive electrode and the negative electrode that are manufactured as described above.

The separator may have a pore size of about 0.01 μm to about 10 pin, and a thickness of about 5 μm to about 300 μm. Examples of materials for the separator may include an olefin-based polymer, such as polypropylene or polyethylene, and a sheet or non-fabric form formed of glass fiber. When a solid electrolyte, e.g., a polymer, is used as an electrolyte, the solid electrolyte may also act as a separator.

The lithium salt-containing non-aqueous electrolyte may include a non-aqueous electrolytic solution and a lithium salt. Examples of the non-aqueous electrolyte may include a non-aqueous electrolytic solution, an organic solid electrolyte, and an inorganic solid electrolyte.

The non-aqueous electrolytic solution may include, e.g., an aprotic organic solvent, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofurane, dimethylsulfoxide, 1,3-dioxorane, N,N-formamide, N,N-dimethylformamide, acetonitrile, nitromethane, methyl formate, methyl acetate, triester phosphate, trimethoxy methane, sulforane, methyl sulforane, 1,3-dimethyl-2-imidazolidinone, propylene carbonate, a tetrahydrofurane derivative, ether, methyl propionate, and ethyl propionate.

Non-limiting examples of the organic solid electrolyte may include a polyethylene derivative, a polyethylene oxide derivative, a polypropylene oxide derivative, a phosphate ester polymer, polyester sulfide, polyvinyl alcohol, and polyvinylidene fluoride.

Non-limiting examples of the inorganic solid electrolyte may include nitrides, halides, and sulfates of Li, such as $Li_3N$, LiI, $Li_5Ni_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be any one of various materials that are easily dissolved in the non-aqueous electrolyte. Examples of such materials may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl4$, $CH_3SO_3Li$, $CF_3SO_3Li$, $(CF_3SO_2)_2NLi$, lithium chloroborate, lower aliphatic lithium carbonate, and tetrakisphenyl lithium borate.

FIG. 1 illustrates a schematic view of a lithium secondary battery 20 according to an embodiment.

Referring to FIG. 1, the lithium secondary battery 20 may include a positive electrode 13, a negative electrode 12, a separator 14 interposed between the positive electrode 13 and the negative electrode 12, an electrolyte (not shown) with which the positive electrode 13, the negative electrode 12, and the separator 14 are impregnated, a battery case 15, and a sealing member 16 that seals the battery case 15. The lithium secondary battery 20 may be constructed such that the positive electrode 13, the negative electrode 22, and the separator 14 are sequentially stacked in this stated order and then the resultant structure is rolled in a jelly-roll form and placed in the battery case 15. The battery case 15 may be sealed by using a sealing member 16, thereby completing the manufacturing of the lithium secondary battery 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

Preparation of Lithium Composite Oxide 0.22 mol nickel sulfate, 0.12 mol cobalt sulfate, and 0.66 mol manganese sulfate were dissolved in water to prepare a metal acetate solution containing nickel, cobalt, and manganese.

Lithium hydroxide and ammonium hydroxide (with a concentration 2 times greater than that of lithium hydroxide) were used to prepare a lithium hydroxide/ammonium hydroxide solution, which was then dropped to the metal acetate solution containing nickel, cobalt, and manganese to perform a co-precipitation reaction.

The resultant mixture was purged with nitrogen and then the obtained co-precipitate was washed with water and dried to obtain metal hydroxide $Ni_{0.2}Co_{0.2}Mn_{0.6}(OH)_2$.

1 mol of the metal hydroxide $Ni_{0.2}Co_{0.2}Mn_{0.6}(OH)_2$, 0.675 mol $Li_2CO_3$, and 0.04 mol lithium fluoride were mixed. Then, water was added thereto and the result was mixed, and the mixture was heat treated under an oxidizing gas atmosphere (including 20 vol % of oxygen and 80 vol % of nitrogen) at a temperature of about 700° C. for 10 hours. Then, the result was cooled at a rate of 0.5° C./min down to a temperature of 30° C. (for about 1,400 minutes) to obtain a lithium composite oxide ($Li[Li_{1/6}Ni_{1/6}Co_{1/6}Mn_{1/2}]O_{1.96}F_{0.04}$).

EXAMPLE 2

Preparation of Lithium Composite Oxide

A lithium composite oxide ($Li[Li_{1/6}Ni_{1/6}Co_{1/6}Mn_{1/2}]O_{1.96}F_{0.04}$) was prepared in the same manner as Example 1, except that the cooling was performed at a rate of 2° C./min in preparing a lithium composite oxide from metal hydroxide.

EXAMPLE 3

Preparation of Lithium Composite Oxide

A lithium composite oxide ($Li[Li_{1/6}Ni_{1/6}Co_{1/6}Mn_{1/2}]O_{1.98}F_{0.02}$) was prepared in the same manner as Example 1, except that 0.02 mol of lithium fluoride was used.

EXAMPLE 4

Preparation of Lithium Composite Oxide

A lithium composite oxide ($Li[Li_{1/6}Ni_{1/6}Co_{1/6}Mn_{1/2}]O_{1.94}F_{0.06}$) was prepared in the same manner as Example 1, except that 0.06 mol of lithium fluoride was used.

EXAMPLE 5

Preparation of Lithium Composite Oxide

A lithium composite oxide ($Li[Li_{1/6}Ni_{1/6}Co_{1/6}Mn_{1/2}]O_{1.98}F_{0.02}$) was prepared in the same manner as Example 3, except that the cooling was performed at a rate of 2° C./min in preparing a lithium composite oxide from metal hydroxide.

EXAMPLE 6

Preparation of Lithium Composite Oxide

A lithium composite oxide ($Li[Li_{1/6}Ni_{1/6}Co_{1/6}Mn_{1/2}]O_{1.94}F_{0.02}$)) was prepared in the same manner as Example 3, except that the cooling was performed at a rate of 2° C./min in preparing the lithium composite oxide from metal hydroxide.

EXAMPLE 7

Preparation of Lithium Composite Oxide

A lithium composite oxide ($Li[Li_{1/6}Ni_{1/6}Co_{1/6}Mn_{1/2}]O_{1.96}F_{0.04}$) was prepared in the same manner as Example 3, except that 0.04 mol ammonium fluoride ($NH_4F$) was used instead of 0.04 mol lithium fluoride, and lithium from the lithium fluoride was replaced with a corresponding amount of $Li_2CO_3$.

EXAMPLE 8

Preparation of Lithium Composite Oxide

A lithium composite oxide ($Li[Li_{1/6}Ni_{1/6}Co_{1/6}Mn_{1/2}]O_{1.96}F_{0.04}$) was prepared in the same manner as Example 1, except that the heat treatment temperature was 750° C.

COMPARATIVE EXAMPLE 1

Preparation of Lithium Composite Oxide

A lithium composite oxide was prepared in the same manner as in Example 1, except that the cooling was performed at a rate of 4.0° C./min in preparing the lithium composite oxide from metal hydroxide.

COMPARATIVE EXAMPLE 2

Preparation of Lithium Composite Oxide

A lithium composite oxide ($Li[Li_{1/6}Ni_{1/6}Co_{1/6}Mn_{1/2}]O_2$) was prepared in the same manner as in Example 1, except that lithium fluoride was not used.

COMPARATIVE EXAMPLE 3

Preparation of Lithium Composite Oxide

A lithium composite oxide ($Li[Li_{1/6}Ni_{1/6}Co_{1/6}Mn_{1/2}]O_2$) was prepared in the same manner as in Example 1, except that lithium fluoride was not used and in preparing the lithium composite oxide from metal hydroxide, the cooling was performed at a rate of 2° C./min.

COMPARATIVE EXAMPLE 4

Preparation of Lithium Composite Oxide

A lithium composite oxide ($Li[Li_{1/6}Ni_{1/6}Co_{1/6}Mn_{1/2}]O_2$) was prepared in the same manner as Example 1, except that lithium fluoride was not used and in preparing the lithium composite oxide from metal hydroxide, the cooling was performed at a rate of 4° C./min.

MANUFACTURING EXAMPLE 1

Manufacturing of Positive Electrode and Lithium Battery Including the Same

A 2032 coin half-cell was manufactured as follows:

92 wt % of the lithium composite oxide prepared according to Example 1, 4 wt % of polyvinylidene fluoride, and 4 wt % of carbon black, which was a conductive agent, were prepared. Then, N-methylpyrrolidone, which was a solvent, was added thereto in such an amount that a weight ratio of N-methylpyrrolidone to the positive active material was 1:1. Bubbles were removed from the mixture by using a mixing machine, thereby obtaining a homogeneously dispersed slurry for forming a positive active material layer.

The slurry was coated on an aluminum film by using a doctor blade to form a thin electrode plate. The electrode plate was then dried at a temperature of 135° C. for 3 hours or more, and then pressed and vacuum-dried to form a positive electrode.

The positive electrode was assembled with a lithium metal electrode, which acted as a counter electrode, to manufacture a 2032-type coin half-cell. A separator (thickness: about 16 μm) formed of a porous polyethylene (PE) film, was disposed between the positive electrode and the lithium metal counter electrode. Then, an electrolytic solution was provided thereto, thereby completing manufacturing a 2032-type coin-full cell.

In this regard, The electrolytic solution included a solution containing 1.1 M $LiPF_6$ dissolved in a mixed solvent of ethylenecarbonate (EC) and ethylmethylcarbonate (EMC) at a volumetric ratio of 3:5 was used.

MANUFACTURING EXAMPLES 2 Through 8

Manufacturing of Positive Electrodes and Lithium Batteries Including the Same Half cell batteries were manufactured in the same manner as in Manufacturing Example 1, except that the lithium composite oxides prepared according to Examples 2-6 were used instead of the lithium composite oxide prepared according to Example 1, respectively.

COMPARATIVE MANUFACTURING EXAMPLES 1 Through 4

Manufacturing of Positive Electrodes and Lithium Batteries Including the Same Half cell batteries were manufactured in the same manner as in Manufacturing Example 1, except that as the positive active material, the lithium composite oxide prepared according to Comparative Examples 1-4 were used instead of the lithium composite oxide prepared according to Example 1.

EVALUATION EXAMPLE 1

Analysis Performed Using Electron Scan Microscope

The lithium composite oxides prepared according to Examples 1 and 2 and Comparative Examples 1 to 4 were analyzed by using a scanning electron microscope, and results thereof are shown in FIGS. 2 to 7.

Referring to FIGS. 2 to 7, it may be seen that that, according to a cooling rate and substitution with fluorine, an average diameter of primary particles of a finally obtained lithium composite oxide was increased. This is in line with a decrease in a specific surface area, which may be seen by referring to Table 4 of Evaluation Example 5, which will be described in greater detail below. Also, due to a decrease in heat energy applied to a source material caused by an increase in the cooling rate, the growth of particles was suppressed and thus finer particles were obtained. This may also be seen by referring to BET measurement results.

Generally, the capacity and efficiency of a positive active material may be proportional to a surface area of the positive active material. However, even though the F-containing Li-rich positive active materials prepared according to Examples 1 and 2 had, as shown in Table 4, smaller specific surface areas than those prepared according to Comparative Examples 1 to 4, the positive active materials of Examples 1 and 2 exhibited excellent electrochemical characteristics, compared to those of Comparative Examples 1 to 4 due to an increase in crystallinity caused by the homogeneous distribution of fluorine (F).

EVALUATION EXAMPLE 2

X-Ray Diffraction Analysis

Figure 8:
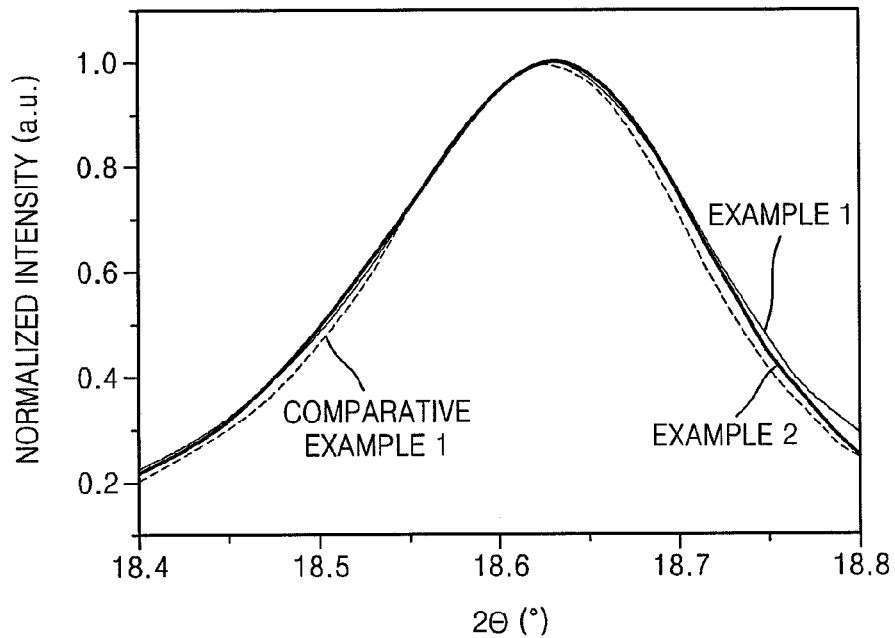
FIG. 8 illustrates a graph showing x-ray diffraction analysis results of lithium composite oxides prepared according to Examples 1 and 2 and Comparative Example 1.
Figure 9:
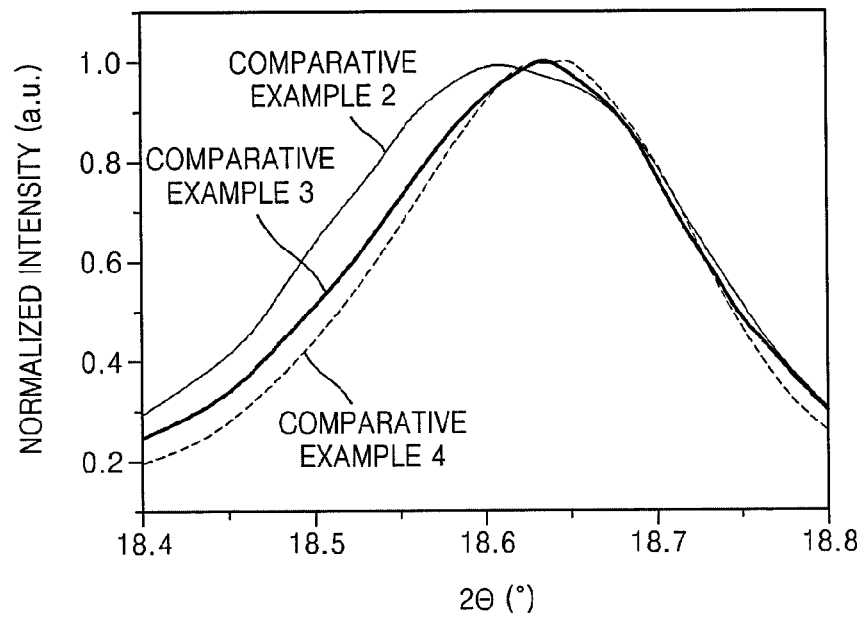
FIG. 9 illustrates a graph showing x-ray diffraction analysis results of lithium composite oxides prepared according to Comparative Examples 2-4.

X-ray diffraction analysis was performed on the lithium composite oxides prepared according to Examples 1 and 2 and Comparative Examples 1 to 4, and results thereof are shown in FIGS. 8 and 9. Such X-ray diffraction analysis results were used to calculate a full width at half maximum of a diffraction angle at the (003) surface, and the obtained values are shown in Table 1, below.

The X-ray diffraction analysis was performed by using an X-ray spectrometer manufactured by PANalytical company as an analyzing device under conditions including a scan region of 15-70 degrees, a scan interval of 0.05 degrees, and a scan rate of once/0.5 sec.

FIG. 8 illustrates an enlarged view of a peak corresponding to the (003) surface having a rhombohedral structure from among x-ray diffraction analysis results of the lithium composite oxide prepared according to Examples 1 and 2 and Comparative Example 1.

TABLE 1

|  | Full width at half maximum (FWHM) of (003) peak (°) |
|---|---|
| Comparative Example 2 (Reference after slow cooling) | 0.257 |
| Comparative Example 3 (Reference after normal cooling) | 0.221 |
| Comparative Example 4 (Reference after fast cooling) | 0.209 |
| Example 1 (Fluorine-doped after slow cooling) | 0.219 |
| Example 2 (Fluorine-doped after normal cooling) | 0.216 |
| Comparative Example 1 (Fluorine-doped after fast cooling) | 0.213 |

FIG. 9 illustrates an enlarged view of a peak corresponding to the (003) surface having a rhombohedral structure from among x-ray diffraction analysis results of the lithium composite oxide prepared according to Comparative Examples 2-4.

Referring to FIG. 9, in the case of a lithium composite oxide that did not include fluorine, when the cooling rate deceased, a diffraction angle at the (003) surface in power X-ray diffraction spectrum obtained by using CuKα ray increased. This may be because during slow cooling, lithium, nickel, manganese, and cobalt were re-decomposed to form a spinel shape and thus, a specific capacity of the lithium composite oxide decreased.

On the other hand, referring to FIG. 8, in the case of a lithium composite oxide that included fluorine, a full-width at half maximum of a diffraction angle at the (003) surface in power X-ray diffraction spectrum obtained by using CuKα ray varied considerably according to the cooling rate. When a lithium composite oxide included fluorine, local structures of cobalt and manganese are changed. To compensate for charges, cobalt and manganese were partially reduced to have a very stable structure. Accordingly, a lithium composite oxide having such a structure may not undergo a decrease in capacity after initial charging and discharging.

EVALUATION EXAMPLE 3

Charging and Discharging Test

Charging and discharging characteristics of the coin-half cells manufactured according to Manufacturing Examples 1-6 and Comparative Manufacturing Examples 1-4 were evaluated by using a charging and discharging device (manufacturer: TOYO, model: TOYO-3100), and results thereof are shown in Table 2, below.

First, the coin-half cells manufactured according to Manufacturing Examples 1-8 and Comparative Manufacturing Examples 1-4 were charged and discharged at 0.1 C to perform a formation process. Then, the cells were charged and discharged at 0.1 C to identify initial charging and discharging characteristics. During charging, the charging began in a constant current (CC) mode, and then the mode was changed into a constant voltage (CV) mode which is set to cut off at 0.05 C; and during discharging, the cut-off was set at 2.5 V in a CC mode.

(1) Initial Charging and Discharging Efficiency (Initial Charge Efficiency): I.C.E The initial charging and discharging efficiency was measured according to Equation 1.

Initial charging and discharging efficiency [%]=[1$^{st}$ cycle discharging capacity/1st cycle charging capacity]×100     [Equation 1]

(2) Charging Capacity and Discharging Capacity

During the first cycle, charging capacity and discharging capacity were measured.

TABLE 2

|  | Charging capacity (mAh/g) | Discharging capacity (mAh/g) | I.C.E |
|---|---|---|---|
| Manufacturing Example 1 | 299.1 | 280.4 | 93.7 |
| Manufacturing Example 2 | 297.0 | 277.7 | 93.5 |
| Manufacturing Example 3 | 303.8 | 270.1 | 89.1 |
| Manufacturing Example 4 | 301.2 | 271.4 | 90.1 |
| Manufacturing Example 5: | 293.5 | 276.2 | 94.1 |
| Manufacturing Example 6 | 294.8 | 266.2 | 90.3 |
| Manufacturing Example 7 | 298.3 | 276.8 | 92.8 |
| Manufacturing Example 8 | 294.8 | 260.9 | 88.1 |
| Comparative Manufacturing Example 1 | 310 | 229 | 73.9 |
| Comparative Manufacturing Example 2 | 293.8 | 247.8 | 84.4 |
| Comparative Manufacturing Example 3 | 298.6 | 255.3 | 85.5 |
| Comparative Manufacturing Example 4 | 301.3 | 260.3 | 86.4 |

EVALUATION EXAMPLE 4

Charging Characteristics According to Rate

Charging and discharging characteristics of the coin-half cells manufactured according to Manufacturing Examples 1 and 2 and Comparative Manufacturing Examples 1-4 were evaluated by using a charging and discharging device (manufacturer: TOYO, model: TOYO-3100). Results thereof are shown in Table 3, below.

The coin cells manufactured according to Manufacturing Examples 1-2 and Comparative Manufacturing Examples 1-4 were discharged at 0.2 C, 0.33 C, 1 C, 2 C, and 3 C, and discharging capacities thereof were compared to each other, and results thereof are shown in Table 3.

TABLE 3

|  | Manufacturing Example 1 | Manufacturing Example 2 | Comparative Manufacturing Example 1 | Comparative Manufacturing Example 2 | Comparative Manufacturing Example 3 | Comparative Manufacturing Example 4 |
|---|---|---|---|---|---|---|
| 0.2 C | 257.3 | 256.0 | 238.2 | 229.4 | 236.4 | 242.7 |
| 0.33 C | 250.1 | 248.7 | 230.8 | 220.7 | 228.5 | 234.7 |
| 1 C | 232.2 | 230.7 | 210.6 | 119.7 | 203.6 | 212.3 |
| 2 C | 215.9 | 214.4 | 193.3 | 179.1 | 183.8 | 194.3 |
| 3 C | 203.0 | 201.9 | 180.7 | 166.0 | 172.1 | 181.0 |
| 1 C/0.1 C | 82.8 | 83.1 | 82.0 | 79.8 | 79.8 | 81.6 |
| 3 C/0.33 C | 81.2 | 81.2 | 78.3 | 75.2 | 75.3 | 77.1 |

In Table 3, 1 C/0.1 C indicates a ratio of 1 C discharging capacity to 0.1 C discharging capacity, and 3 C/0.33 C indicates a ratio of 3 C discharging capacity to 0.33 C discharging capacity. Also, 0.2 C, 0.33 C, 1 C, 2 C, and 3 C respectively indicate a discharging capacity at 0.2 C, 0.33 C, 1 C, 2 C, and 3 C.

Referring to Table 3, when a discharging rate increased, generally, a discharging capacity decreased. However, during high-rate discharging at 1 C or more, the coin cells manufactured according to Manufacturing Examples 1 and 2 had higher discharging capacity than the coin cells manufactured according to Comparative Manufacturing Examples 1-4. For example, in the case of the coin cells manufactured according to Manufacturing Examples 1 and 2, when a discharging rate increases, a difference in discharging capacity substantially increased.

EVALUATION EXAMPLE 5

BET Specific Surface Area

BET specific surface areas of the lithium composite oxides manufactured according to Examples 1 and 2 and Comparative Examples 1-4 were measured according to a BET method, and results thereof are shown in Table 4.

TABLE 4

| | BET specific surface area (m²/g) |
|---|---|
| Example 1 | 5.0 |
| Example 2 | 4.9 |
| Comparative Example 1 | 5.1 |
| Comparative Example 2 | 5.6 |
| Comparative Example 3 | 5.5 |
| Comparative Example 4 | 5.3 |

Referring to Table 4, even if the lithium composite oxides prepared according to Examples 1 and 2 had a smaller BET specific surface area than the lithium composite oxides prepared according to Comparative Examples 1 to 4, the lithium composite oxides prepared according to Examples 1 and 2 had excellent electrochemical characteristics as described in Evaluation Examples 4 and 5.

By way of summation and review a positive active material may include a lithium cobalt oxide and a lithium nickel composite oxide. In some cases, a transition metal may be added to a lithium nickel composite oxide to help compensate for stability and cyclic characteristics. However, lithium nickel composite oxides may have unsatisfactory electrochemical characteristics, such as capacity characteristics.

The embodiments provide a positive active material for a lithium secondary battery in which irreversible capacity loss may be suppressed and/or prevented during initial charging and discharging.

The embodiments provide a lithium secondary battery that employs the positive active material to help improve capacity and lifespan characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An active material for a lithium secondary battery, the active material comprising a lithium composite oxide represented by the following Formula 1:

Li[Li$_x$Ni$_a$Co$_b$Mn$_c$]O$_{2-y}$F$_y$,     [Formula 1]

wherein:
in Formula 1, x, a, b, c, and y satisfy the following relations: 0.05≤x≤0.3, 0.12≤a≤0.25, 0.00≤b≤0.25, 0.45≤c≤0.60, x+a+b+c=1.0, 1.25≤(1+x)/(a+b+c)≤1.6, and 0<y≤0.1, and
the lithium composite oxide has a full width at half maximum of a diffraction angle at a (003) surface of about 0.216° to about 0.219° in a powder X-ray diffraction spectrum obtained by using CuKα ray.

2. The active material as claimed in claim 1, wherein the lithium composite oxide represented by Formula 1 is represented by the following Formula 1a:

Li[Li$_{1/6}$Ni$_{1/6}$Co$_{1/6}$Mn$_{1/2}$]O$_{2-y}$F$_y$, in which 0<y≤0.1.     [Formula 1a]

3. The active material as claimed in claim 1, wherein, in Formula 1, 0.02≤y≤0.06.

4. The active material as claimed in claim 1, wherein the lithium composite oxide represented by Formula 1 is one of Li[Li$_{1/6}$Ni$_{1/6}$Co$_{1/6}$Mn$_{1/2}$]O$_{1.96}$F$_{0.04}$, Li[Li$_{1/6}$Ni$_{1/6}$Co$_{1/6}$Mn$_{1/2}$]O$_{1.94}$F$_{0.06}$, or Li[Li$_{1/6}$Ni$_{1/6}$Co$_{1/6}$Mn$_{1/2}$]O$_{1.98}$F$_{0.02}$.

5. The active material as claimed in claim 1, wherein, in Formula 1, x, a, b, c, and y satisfy the following relations: 0.1≤x≤0.2, 0.17≤a≤0.21, 0.05≤b≤0.17, 0.50≤c≤0.55, 0.01≤y≤0.1.

6. A method of manufacturing an active material for a lithium secondary battery, the method comprising:
mixing a fluorine-containing compound, a lithium compound, and a metal hydroxide represented by the following Formula 2:

Ni$_a$Co$_b$Mn$_c$(OH)$_2$     [Formula 2]

wherein, in Formula 2, a, b, and c satisfy the following relations: 0.15≤a≤0.30, 0.0≤b≤0.30, 0.55≤c≤0.70, and a+b+c=1.0;
heat treating the mixture under an oxidizing atmosphere at a temperature of about 650° C. to about 850° C.; and
cooling the heat treated mixture at a cooling rate of about 0.1° C./min to about 2° C./min such that the active material includes a lithium composite oxide having a full width at half maximum of a diffraction angle at a (003) surface of about 0.216° to about 0.219° in a powder X-ray diffraction spectrum obtained by using CuKα ray.

7. The method as claimed in claim 6, wherein the lithium composite oxide is represented by the following Formula 1:

Li[Li$_x$Ni$_a$Co$_b$Mn$_c$]O$_{2-y}$F$_y$,     [Formula 1]

wherein, in Formula 1, x, a, b, c, and y satisfy the following relations: 0.05≤x≤0.3, 0.12≤a≤0.25, 0.00≤b≤0.25, 0.45≤c≤0.60, x+a+b+c=1.0, 1.25≤(1+x)/(a+b+c)≤1.6, and 0<y≤0.1.

8. The method as claimed in claim 6, wherein the fluorine-containing compound includes LiF or NH$_4$F.

9. The method as claimed in claim 6, wherein the cooling is performed for about 350 to about 7,000 minutes.

10. The method as claimed in claim 6, wherein the heat treating is performed at about 675° C. to about 750° C.

11. The method as claimed in claim 6, wherein the heat treating is performed for about 1 to about 10 hours.

12. The method as claimed in claim 6, wherein the oxidizing atmosphere includes:
about 10 to about 20 vol % of oxygen or air, and
about 80 to about 90 vol % of inert gas.

13. The method as claimed in claim 6, wherein the metal hydroxide represented by Formula 2 includes one of Ni$_{1/6}$Co$_{1/6}$Mn$_{1/2}$(OH)$_2$ or Ni$_{0.2}$Co$_{0.2}$Mn$_{0.6}$(OH)$_2$.

14. The method as claimed in claim 7, wherein the active material represented by Formula 1 is one of Li[Li$_{1/6}$Ni$_{1/6}$Co$_{1/6}$Mn$_{1/2}$]O$_{1.96}$F$_{0.04}$, Li[Li$_{1/6}$Ni$_{1/6}$Co$_{1/6}$Mn$_{1/2}$]O$_{1.94}$F$_{0.06}$, or Li[Li$_{1/6}$Ni$_{1/6}$Co$_{1/6}$Mn$_{1/2}$]O$_{1.98}$F$_{0.02}$.

15. An electrode for a lithium secondary battery, the electrode comprising the active material as claimed in claim 1.

16. A lithium secondary battery including the electrode as claimed in claim 15.

17. The active material as claimed in claim 1, wherein the lithium composite oxide is prepared by:
mixing a fluorine-containing compound, a lithium compound, and a metal hydroxide represented by the following Formula 2:

Ni$_a$Co$_b$Mn$_c$(OH)$_2$     [Formula 2]

wherein, in Formula 2, a, b, and c satisfy the following relations: $0.15 \leq a \leq 0.30$, $0.0 \leq b \leq 0.30$, $0.55 \leq c \leq 0.70$, and $a+b+c=1.0$;

heat treating the mixture under an oxidizing atmosphere at a temperature of about 650° C. to about 850° C.; and cooling the heat treated mixture at a cooling rate of about 0.1° C./min to about 2° C./min.

\* \* \* \* \*